United States Patent [19]

Varadaraj

[11] Patent Number: 5,417,864

[45] Date of Patent: May 23, 1995

[54] DECONTAMINATION OF HYDROCARBON CONTAINING SUBSTRATES (LAW100)

[75] Inventor: Ramesh Varadaraj, Flemington, N.J.

[73] Assignee: Exxon Research and Engineering Company, Florham Park, N.J.

[21] Appl. No.: 233,652

[22] Filed: Apr. 26, 1994

[51] Int. Cl.$^6$ .................. B01D 17/035; B01D 11/02; B09B 5/00

[52] U.S. Cl. ................... 210/703; 210/704; 210/908; 210/909; 134/19; 134/25.1; 134/40; 405/128

[58] Field of Search ............ 134/19, 25.1, 40; 210/703, 704, 908, 909; 209/164, 166, 17; 405/128

[56] References Cited

U.S. PATENT DOCUMENTS

| | | |
|---|---|---|
| 4,336,136 | 6/1982 | Gighere . |
| 4,783,263 | 11/1988 | Trost . |
| 4,851,122 | 7/1989 | Mishra . |
| 4,923,125 | 5/1990 | Bateson . |
| 4,969,775 | 11/1990 | Cappel . |
| 5,019,245 | 5/1991 | Ignasiak . |
| 5,115,986 | 5/1992 | Bateson . |
| 5,223,147 | 6/1993 | Rosenstock . |
| 5,286,386 | 2/1994 | Darian . |

FOREIGN PATENT DOCUMENTS

| | | |
|---|---|---|
| 178009 | 4/1986 | European Pat. Off. . |
| 251562 | 1/1988 | European Pat. Off. . |

Primary Examiner—Thomas M. Lithgow
Attorney, Agent, or Firm—Joseph J. Dvorak

[57] ABSTRACT

Simply stated, in the process of the present invention a hydrocarbon contaminated substrate, such as a hydrocarbon contaminated soil, is separated preferably by wet-sieving, into a coarse fraction and a fines fraction. Thereafter, the coarse fraction is subjected to a floatation process to remove hydrocarbon contaminants from it and the fines fractions is treated with a hydrocarbon solvent followed by an aqueous solution of a surfactant to remove hydrocarbon contaminants from it.

10 Claims, No Drawings

DECONTAMINATION OF HYDROCARBON CONTAINING SUBSTRATES (LAW100)

FIELD OF THE INVENTION

The present invention is concerned with the treatment of hydrocarbon contaminated substrates such as oily soil to promote the removal of hydrocarbons from the substrate.

BACKGROUND OF THE INVENTION

Many industrial operations produce waste materials consisting of hydrocarbon contaminated solid substrates which must be decontaminated prior to disposal in an environmentally acceptable way. Similarly, hydrocarbon contaminated substrates that had been disposed of previously under less stringent environmental regulations and accidental spills of hydrocarbon materials have led to hydrocarbon contaminated soils which must be treated to substantially reduce the hydrocarbon contaminant present in the soils to acceptable levels. Thus, the ability to economically separate hydrocarbon contaminants from solid substrates, such as soil, is extremely important not only in cleaning up previously contaminated soils but also in separating hydrocarbon contaminated industrial solid wastes into reusable and disposable fractions.

Various techniques are known in the art for treating hydrocarbon containing substrates. These include solvent extraction, water washing, incineration, flotation and the like. As useful as these various techniques may be, each has its own debits. For example, water washing techniques known in the art typically result in the formation of hydrocarbon and water emulsions that are extremely difficult to break. Treatment of soils with hydrocarbons solvents involves higher materials and separation costs than when water is used. Incineration is costly and requires control of noxious emissions. Floatation is limited in its applicability to specific soil types and a narrow range of contaminant types. Therefore, there remains a need for a method of separating hydrocarbon contaminants from soil substrates that is more economical and versatile.

SUMMARY OF THE INVENTION

Simply stated, in the process of the present invention a hydrocarbon contaminated substrate, such as a hydrocarbon contaminated soil, is separated, preferably by wet-sieving, into a coarse fraction and a fines fraction. Thereafter, the coarse fraction is subjected to a floatation process to remove hydrocarbon contaminants from it and the fines fractions is treated with a hydrocarbon solvent followed by an aqueous solution of a surfactant to remove hydrocarbon contaminants from it.

DETAILED DESCRIPTION OF THE INVENTION

In general, the present invention comprises a method for decontaminating a hydrocarbon containing substrate based on particle size, physio-chemical properties of the contaminant and the like. For convenience, the invention will be described in terms of decontaminating a hydrocarbon containing soil.

In hydrocarbon contaminated soil, such as refinery soils, the distribution of the hydrocarbon contaminate is not uniform. Typically, such soils contain different types of contaminant on the coarse particles in the soil in contrast to that on the fine particles in the soil. Thus, the first stage of the process of the present invention is to separate the soil into a coarse fraction and a fines fraction. Preferably this is achieved by the standard wet sieving technique with water. The size of the coarse and fines particles in the two fractions is not critical although it is desirable in choosing the particle size cut-off between coarse and fine fractions to take into consideration factors such as the nature of the contaminant and the nature of the soil. Preferably, the partial size cut-off between the coarse and fines fractions will be selected so that the course fraction will contain a substantial amount of the hydrocarbon contaminant in the soil that is amenable to separation from the soil by floatation.

In general, the fine fractions will have particles smaller than about 380 um and hence the coarse fractions will have particles generally larger than that size.

Frequently, the coarse fraction will contain not only hydrocarbon contaminate soil particles, but also coarse particles of organic material which because they tend to float on water hereinafter referred to as "floatables".

As stated previously, wet sieving is a particularly preferred technique for separating the soil into a coarse fraction and a fines fraction.

After wet-sieving the coarse particles and the floatables are subjected to a floatation process. For example, they are introduced to a froth flotation cell as an aqueous pulp or suspension containing a frothing agent. Air is bubbled through the cell in the normal manner resulting in contaminants rising to the surface in the froth for separation.

It is particularly preferred in the practice of the present invention to use a nonionic ethoxylate surfactant sold under the name Exxal 12-7 by Exxon Chemicals Company, Houston, Tex. as frothing agent.

The fines fraction is separated from the wet sieve flush water by decantation, filtration or the like. The fines are allowed to air dry preferably to less than 4 wt % moisture and then are pretreated with a hydrocarbon solvent. The hydrocarbon solvent may be chosen from various petroleum distillates or natural product solvents like terpenes. It is particularly preferred in the practice of the current invention to use a terpene solvent for the fines pretreat. Especially preferred is a mixture of naturally occurring terpenes having a boiling point of 173° C., a specific gravity of 0.84 and sold under the trade name RENTRY D SOLVENT by Envirosolv Inc., jacksonville, Fla. The pretreat may be conducted from 10:0.5 to 10:3 fines to solvent wt/volume ratio. It is preferred, however, to use a 10:2 wt/vol ratio. The pretreat is conducted by addition of solvent to the contaminated fines followed by mechanical mixing with a paddle or like for 30 minutes to ensure good contact between solvent and contaminated fines. The pretreat can be conducted at ambient or elevated temperatures. Typically, the pretreat is conducted at an ambient temperature of about 25° C.

After pre-treatment, a 1% aqueous surfactant solution is added to the fines solvent mixture and stirred, for example, with a paddle stirrer at about 120 rpm for about 30 minutes to about 1 hour. The fines to aqueous surfactant solution generally will be between about 1:5 to about 1:20 wt/volume ratio. The ratio depends upon the nature of fines, contaminant, and their propensity to form undesirable emulsions. In the practice of the present invention, it is preferred to use a 1:9 fines to surfactant solution ratio whereby undesirable emulsion formation is avoided.

The surfactants used for the treatment are chosen from commercial nonionic, anionic or cationic surfactants that are good "wetting agents" and sold under that class. In the practice of the invention it is preferred to use ethoxysulfate wetting agents such as an ethoxysulfate surfactant sold by Shell Chemical Company, Houston, Tex. under the name NEODOL-25-3S.

After washing with the aqueous surfactant solution the sol ids are separated from the liquid phase by any convenient method. For example, after settling or alternatively centrifuging, the liquid may be decanted thereby providing a solid fraction with reduced contaminant and a liquid phase containing the contaminant removed from the fines.

Optionally, the fines fraction may subjected to repetitive pretreat and surfactant washings to achieve desired level of contaminant reduction.

The net result is that the treated soil is separated into four fractions: a coarse solids fraction from which a substantial quantity of hydrocarbon contaminate has been removed; floatable soil organics; a fines fraction from which a substantial amount of the hydrocarbon contaminate has been removed; and, an oily aqueous phase.

It should be apparent from the foregoing that the method described offers many advantages. For example, only that fraction of the soil amenable to floatation is so treated. The balance of the soil is treated in such a way as to minimize the amount of hydrocarbon solvent while avoiding emulsion formation.

To further illustrate the invention, the following examples are provided.

EXAMPLE 1

41 g (dry weight) of a weathered refinery soil that had about 3.65 wt % methylene chloride extractable hydrocarbon contaminant was wet sieved on a U.S. Standard 40 mesh sieve (380 um aperture) with water flush for 10 minutes. The coarse residue (dry weight 27 g) left back on the sieve was a combination of soil particles >380 um and black particulates, or "floatables". The coarse residue and floatables were transferred to a floatation cell. The cell was charged with 250 ml of a 0.5 wt % EXXAL 12-7 nonionic ethoxylate aqueous solution and a steady stream of air was sparged into the mixture for 1 hour. Copious amounts of foam were generated and the floatables were carried by the foam through the outlet into a collection chamber. Once in the collection chamber, the foam collapsed and the floatable particulates were collected. In this example, 1.8 g (dry weight) of floatables were collected from 27 g of the material charged into the floatation cell. 25.2 g of the coarse material left behind in the floatation cell had 0.8 wt % methylene chloride extractable hydrocarbon contaminant on it.

EXAMPLE 2

The fines obtained from wet sieving as described in Example 1 was separated from the aqueous phase and dried. Then 14 g (dry weight) of the contaminated fines containing 7.45 wt % contaminant was pretreated with 2.2 ml of RENTRY D SOLVENT by addition of solvent to fines and mixing for 30 minutes at 25° C. 125 ml. of an aqueous solution of 1% NEODOL-25-3S was added to the fines solvent mixture and the slurry was stirred at 120 rpm for 30 minutes. Centrifugation and decantation resulted in the separation of the decontaminated fines and an oil aqueous phase containing the contaminant.

After repeating the pretreat and wash cycle thrice, the contaminant level in the fines was reduced from 7.45% to 1.71%.

What is claimed is:

1. A method of decontaminating a hydrocarbon contaminated substrate comprising:
   (a) separating the substrate into a coarse fraction in a fines fraction;
   (b) subjecting the coarse fraction to a froth flotation process wherein floatable contaminates are removed from the coarse fraction thereby providing a coarse fraction of reduced contamination;
   (c) mixing the fines fraction with a hydrocarbon solvent in a gm/ml fines to solvent ratio of from about 10:0.5 to about 10:3 and thereafter mixing the fines and hydrocarbon solvent with an aqueous surfactant solution wherein an oily aqueous phase is formed; and
   (d) separating the oily aqueous phase from the fines wherein a fines fraction of reduced contamination is obtained.

2. The method of claim 1, wherein the substrate is a soil and the substrate is separated into a coarse fraction and a fine fraction by wet-sieving.

3. The method of claim 2, wherein the particle size of the coarse fraction is selected such that a substantial amount of contaminant in the soil that is amenable to separation from solids by floatation will be present in the coarse fraction.

4. The method of claim 3, wherein the hydrocarbon solvent is a terpene solvent.

5. The method of claim 4, wherein the fines are mixed with the aqueous surfactant solution in a gm/ml. fines to solvent ratio of from about 1:5 to about 1:20.

6. An improved method for reducing hydrocarbon contaminates in soil comprising:
   (a) separating the soil into a first solids coarse fraction containing a substantial amount of the contaminate in the soil that is separable by froth flotation and a seconds solids fine fraction containing a substantial amount of the contaminate in the soil that is not separable by froth flotation;
   (b) subjecting the first fraction to an aqueous froth flotation process wherein a froth containing floatable contaminant is removed from the first solids coarse fraction thereby providing a coarse solids fraction of reduced contamination;
   (c) mixing the second solids fine fraction with a hydrocarbon solvent in a gm/ml solids to solvent ratio of 10:0.5 to 10:3, thereafter mixing the second solids fine fraction and hydrocarbon solvent with an aqueous surfactant solution in a gm/ml solids to aqueous solution ratio 1:5 to 1:20, to obtain a fine solid phase and an oily liquid phase, and then separating the liquid phase containing contaminants from the fine solid phase of reduced contaminant.

7. The method of claim 6, wherein the soil is separated by wet sieving into said first coarse fraction and said second fines fraction.

8. The method of claim 7, wherein the coarse fraction has particles greater than 380 um in the size.

9. The method of claim 8, wherein the hydrocarbon solvent is a terpene solvent.

10. The method of claim 9, wherein the surfactant is a wetting agent.

* * * * *